United States Patent
Furusawa et al.

(10) Patent No.: US 11,679,482 B2
(45) Date of Patent: Jun. 20, 2023

(54) POWER TOOL

(71) Applicant: MAKITA CORPORATION, Anjo (JP)

(72) Inventors: Masanori Furusawa, Anjo (JP); Hajime Takeuchi, Anjo (JP); Hideki Tsuji, Anjo (JP); Yoshiro Tada, Anjo (JP)

(73) Assignee: MAKITA CORPORATION, Anjo (JP)

( * ) Notice: Subject to any disclaimer, the term of this patent is extended or adjusted under 35 U.S.C. 154(b) by 193 days.

(21) Appl. No.: 17/188,009

(22) Filed: Mar. 1, 2021

(65) Prior Publication Data

US 2021/0283758 A1 Sep. 16, 2021

(30) Foreign Application Priority Data

Mar. 10, 2020 (JP) .............................. JP2020-040543

(51) Int. Cl.
*B25D 17/24* (2006.01)
*B25D 17/04* (2006.01)
*H01M 50/247* (2021.01)
*H01M 50/264* (2021.01)
*H01M 50/296* (2021.01)
(Continued)

(52) U.S. Cl.
CPC ............. *B25D 17/24* (2013.01); *B25D 17/04* (2013.01); *H01M 50/247* (2021.01); *H01M 50/264* (2021.01); *H01M 50/296* (2021.01); *B25D 11/125* (2013.01); *B25D 16/003* (2013.01); *B25D 16/006* (2013.01); *B25D 2211/068* (2013.01); *B25D 2216/0084* (2013.01); *B25D 2217/0073* (2013.01); *B25D 2250/095* (2013.01); *B25D 2250/121* (2013.01); *B25D 2250/265* (2013.01); *H01M 2220/30* (2013.01)

(58) Field of Classification Search
CPC ............ H01M 50/296; H01M 50/264; H01M 50/247; H01M 2220/30; B25D 17/24; B25D 17/04; B25D 11/125; B25D 16/003; B25D 16/006; B25D 2211/068; B25D 2250/095; B25D 2250/121; B25D 2250/265; B25D 2217/0073
See application file for complete search history.

(56) References Cited

U.S. PATENT DOCUMENTS

2005/0058890 A1\* 3/2005 Brazell ............... H01M 50/209
429/97
2012/0061117 A1\* 3/2012 Nagasaka ............. H01M 50/24
173/217
(Continued)

FOREIGN PATENT DOCUMENTS

JP 2018-79557 A 5/2018

*Primary Examiner* — Andrew M Tecco
*Assistant Examiner* — Nicholas E Igbokwe
(74) *Attorney, Agent, or Firm* — Oliff PLC

(57) ABSTRACT

A power tool includes a motor, a housing, a battery holder and a cushion. The battery holder is held by the housing to be movable at least in a first direction relative to the housing. The battery holder is configured to removably receive a battery for supplying electric power to the motor. The cushion is held by the housing such that the first direction intersects the cushion. When the battery is attached to the battery holder, the cushion is directly or indirectly disposed between the battery and the housing.

16 Claims, 8 Drawing Sheets

(51) Int. Cl.
*B25D 16/00* (2006.01)
*B25D 11/12* (2006.01)

(56) References Cited

U.S. PATENT DOCUMENTS

| | | | | |
|---|---|---|---|---|
| 2012/0171539 | A1* | 7/2012 | Rejman | H01M 50/213 |
| | | | | 429/100 |
| 2013/0308253 | A1* | 11/2013 | Ogura | H01M 50/247 |
| | | | | 361/679.01 |
| 2014/0326477 | A1* | 11/2014 | Thorson | B23Q 11/0032 |
| | | | | 173/171 |
| 2014/0329119 | A1* | 11/2014 | Tirone | H01M 50/20 |
| | | | | 429/96 |
| 2017/0106518 | A1* | 4/2017 | Takeuchi | B25F 5/006 |
| 2018/0126534 | A1* | 5/2018 | Iida | B23B 49/003 |
| 2018/0297186 | A1* | 10/2018 | Iida | B25D 17/24 |
| 2019/0381618 | A1* | 12/2019 | Furusawa | B23Q 11/127 |

\* cited by examiner

POWER TOOL

CROSS-REFERENCE TO RELATED APPLICATIONS

The present application claims priority to Japanese patent application No. 2020-040543 filed on Mar. 10, 2020, the contents of which are hereby fully incorporated herein by reference.

TECHNICAL FIELD

The present disclosure relates to a power tool to which a battery is detachably attachable.

BACKGROUND

Various kinds of known power tools use a rechargeable battery as a power source. For example, Japanese Unexamined Patent Application Publication No. 2018-079557 discloses a rotary hammer that includes a housing to which a battery is detachably attachable. When an upper end portion of the battery is attached to a battery-mounting part, a lower end portion of the battery is exposed outside of the housing.

SUMMARY

One aspect of the present disclosure herein provides a power tool that includes a motor, a housing, a battery holder, and a cushion. The housing houses the motor. The battery holder is held by the housing to be movable at least in a first direction relative to the housing. The battery holder is configured to removably receive a battery for supplying electric power to the motor The cushion is held by the housing such that the first direction intersects the cushion. When the battery is attached to the battery holder, the cushion is directly or indirectly disposed between the battery and the housing.

DETAILED DESCRIPTION OF THE EMBODIMENTS

Hereinafter, embodiments of the present disclosure will be described with reference to the drawings. In the following embodiments, rotary hammers are described as examples of a power tool. More specifically, the rotary hammers are examples of a power tool having a hammer mechanism that is configured to linearly drive a tool accessory.

A rotary hammer 1A according to an embodiment will be described with reference to FIG. 1 through FIG. 6. The rotary hammer 1A is configured to linearly drive a tool accessory (not shown) along a driving axis A1 (this action is hereinafter referred to as a hammer action) and to rotationally drive the tool accessory around the driving axis A1 (this action is hereinafter referred to as a drill action), using a battery 8 as a power source.

Figure 1:
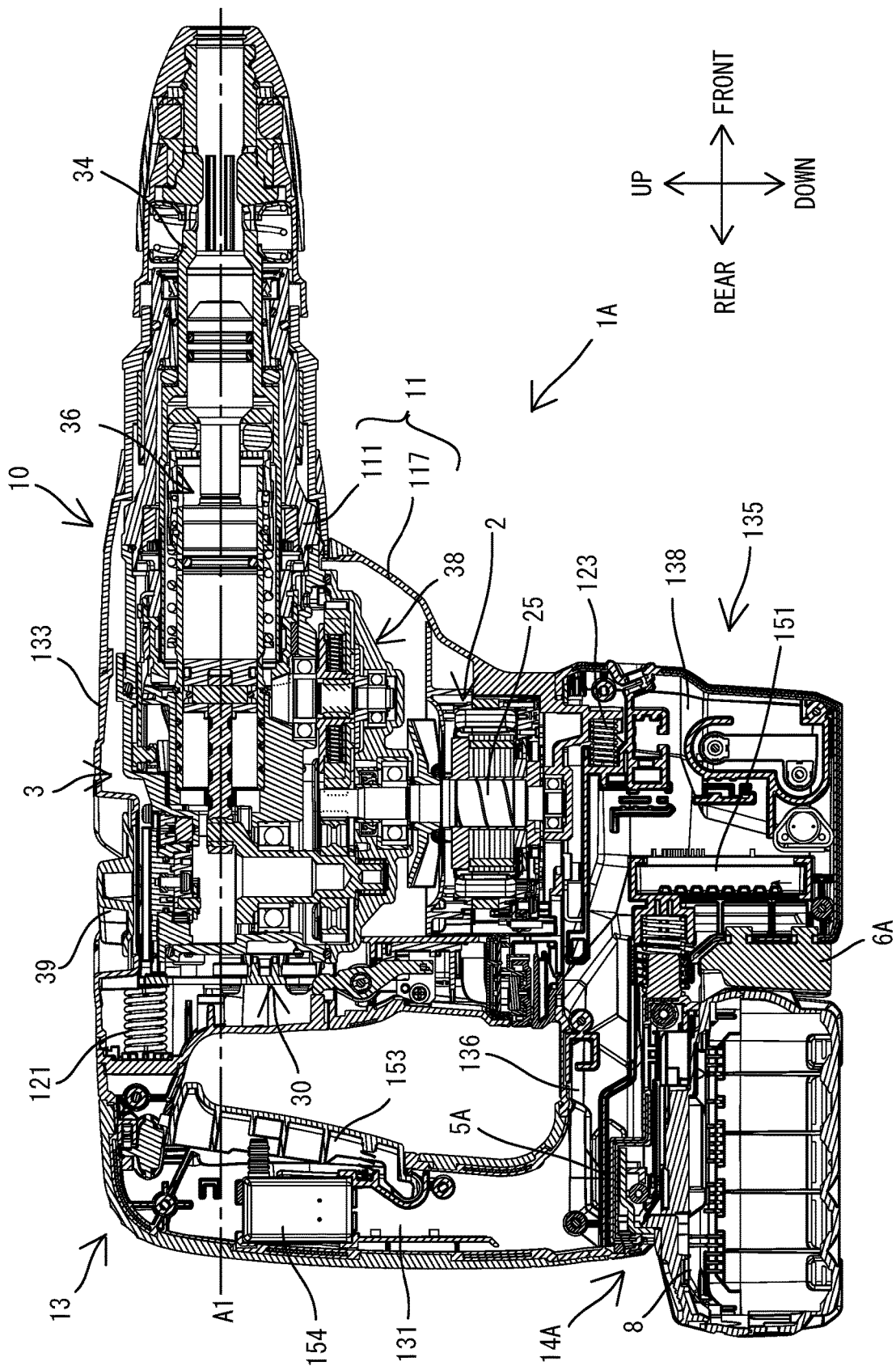
FIG. 1 is a cross-sectional view of a rotary hammer.

The general structure of the rotary hammer 1A is first described with reference to FIG. 1. As shown in FIG. 1, an outer shell of the rotary hammer 1A is mainly formed by a housing 10. The housing 10 of the present embodiment is formed as a so-called vibration-isolating housing. The housing 10 includes a first housing 11 and a second housing 13 that is elastically connected to the first housing 11.

The first housing 11 has a substantially L-shape as a whole. The first housing 11 includes a motor housing part 117 that houses a motor 2, and a driving-mechanism housing part 111 that houses a driving mechanism 3 configured to drive the tool accessory using the power generated by the motor 2.

The driving-mechanism housing part 111 has an elongate shape and extends along the driving axis A1. A tool holder 34, to which the tool accessory can be removably coupled, is disposed in one end portion of the driving-mechanism housing part 111 in a longitudinal direction of the driving-mechanism housing part 111. The motor housing part 117 is fixedly connected to the other end portion of the driving-mechanism housing part 111 in its longitudinal direction. The motor housing part 117 projects from the driving-mechanism housing part 111 in a direction that intersects (specifically, substantially orthogonally intersects) the driving axis A1 and away from the driving axis A1. The motor 2 is disposed such that a rotational axis of a motor shaft 25 is orthogonal to the driving axis A1.

For the sake of convenience in the following description, the directions of the oscillating rotary hammer 1A are related in the following manner. An extension direction of the driving axis A1 of the rotary hammer 1A (the longitudinal direction of the driving-mechanism housing part 111) is defined as a front-rear direction of the rotary hammer 1A. In the front-rear direction, the side of the rotary hammer 1A within which the tool holder 34 is disposed is defined as a front side of the rotary hammer 1A, and the opposite side thereof is defined as a rear side. An extension direction of the rotational axis of the motor shaft 25 is defined as an up-down direction of the rotary hammer 1A. In the up-down direction, the direction toward which the motor housing part 117 projects away from the driving-mechanism housing part 111 is defined as a downward direction of the rotary hammer 1A, and the opposite direction thereof is defined as an upward direction. A direction that is orthogonal to both of the front-rear direction and the up-down direction is defined as a left-right direction.

The second housing 13 is formed as a hollow body having a substantially U-shape as a whole. The second housing 13 includes a grip 131, an upper portion 133 and a lower portion 135.

The grip 131 is configured to be gripped by a user. The grip 131 is spaced apart rearward from the first housing 11. The grip 131 extends in the up-down direction. A trigger 153, which is configured to be manually depressed (pulled) by the user using a finger, is disposed at a front side of the grip 131. The upper portion 133 is connected to an upper end portion of the grip 131. In the present embodiment, the upper portion 133 extends frontward from the upper end portion of the grip 131, and covers the most part of the driving-mechanism housing part 111 of the first housing 11. The lower portion 135 is connected to a lower end portion of the grip 131. In the present embodiment, the lower portion 135 extends frontward from the lower end portion of the grip 131 such that a front portion of the lower portion 135 is disposed below the motor housing part 117. A battery holder 5A is held by (at) a lower rear end portion of the lower portion 135. The rotary hammer 1A is powered by the battery 8, which is detachably attached to the battery holder 5A, as a power source.

With the above-described structure of the rotary hammer 1A, in addition to the second housing 13, the motor housing part 117 of the first housing 11 is interposed between the upper portion 133 and the lower portion 135 in the up-down direction, and is exposed outside. The second housing 13 and the motor housing part 117 form an outer surface of the rotary hammer 1A. In the present embodiment, the second housing 13 is formed by a left shell and a right shell. More specifically, the left shell and the right shell, which are made of synthetic resin, are connected via screws with the first housing 11 interposed and held (sandwiched) between the left shell and the right shell in the left-right direction, so as to form the housing 10.

The detailed structure of the rotary hammer 1A is now described.

First, a vibration-isolating structure of the housing 10 is briefly described with reference to FIG. 1. As described above, in the housing 10, the second housing 13 including the grip 131 is elastically connected to the first housing 11, which houses the motor 2 and the driving mechanism 3, so as to be movable relative to the first housing 11.

More specifically, as shown in FIG. 1, an elastic member 121 is interposed between the driving-mechanism housing part 111 of the first housing 11 and the upper portion 133 of the second housing 13. Further, an elastic member 123 is interposed between the motor housing part 117 of the first housing 11 and the lower portion 135 of the second housing 13. In the present embodiment, a compression coil spring is adopted as each of the elastic members 121 and 123. Each of the elastic members 121 and 123 biases the first housing 11 and the second housing 13 away from each other (such that the grip 131 and the first housing 11 are spaced away from each other) in the extension direction of the driving axis A1. In other words, the first housing 11 and the second housing 13 are biased forward and rearward, respectively. Although the specific illustration thereof is omitted, a guiding structure that is configured to guide a relative movement of the first housing 11 and the second housing 13 in the front-rear direction is disposed in each of the first housing 11 and the second housing 13.

Owing to the above-described vibration-isolating structure, the first housing 11 and the second housing 13 are relatively movable to each other in the front-rear direction. Thus, transmission of the vibration in the extension direction of the driving axis A1 (i.e. in the front-rear direction) from the first housing 11 to the second housing 13 can be effectively suppressed. It is noted that the vibration in the extension direction of the driving axis A1 is the largest and dominant among the vibrations generated in (on) the first housing 11 during the hammer action.

The structures (elements, components) disposed in the first housing 11 are now described.

As shown in FIG. 1, the motor 2 is housed in the motor housing part 117. In the present embodiment, a brushless DC motor is adopted as the motor 2. An upper end portion and a lower end portion of the motor shaft 25 are rotatably supported by bearings. The upper end portion of the motor shaft 25 extends into the driving-mechanism housing part 111. A driving gear is formed on the upper end portion of the motor shaft 25.

The driving mechanism 3 is housed in the driving-mechanism housing part 111. The driving mechanism 3 includes a motion-converting mechanism 30, a striking mechanism 36, and a rotation-transmitting mechanism 38. The driving mechanism 3 having such a structure is well-known, and therefore it is now briefly described.

The motion-converting mechanism 30 is configured to convert rotation of the motor shaft 25 into linear motion and transmits the linear motion to the striking mechanism 36. In the present embodiment, a crank mechanism including a crank shaft and a piston is adopted as the motion-converting mechanism 30. When the motor 2 is driven and the piston is moved frontward, the striking mechanism 36 transmits the kinetic energy to the tool accessory by the action of an air spring. Thus, the tool accessory is linearly driven along the driving axis A1 to strike a workpiece. When the piston is moved rearward, the striking mechanism 36 and the tool accessory are returned to their original positions. In this manner, the motion-converting mechanism 30 and the striking mechanism 36 perform the hammer action.

The rotation-transmitting mechanism 38 is configured to transmit the rotational power of the motor shaft 25 to the tool holder 34. In the present embodiment, the rotation-transmitting mechanism 38 is formed as a speed reducing mechanism including a plurality of gears. An engaging clutch 39 is disposed in (on) a power transmission path of the rotation-transmitting mechanism 38. When the clutch 39 is engaged, the tool holder 34 is rotated by the rotation-transmitting mechanism 38, so that the tool accessory coupled to the tool holder 34 is rotationally driven around the driving axis A1. On the other hand, when the clutch 39 is disengaged, the power transmission to the tool holder 34 by the rotation-transmitting mechanism 38 is interrupted, so that the tool accessory is not rotationally driven.

In the present embodiment, the rotary hammer 1A is driven in a selected one of two modes, that is, a hammer mode and a hammer drill mode. In the hammer mode, the clutch is disengaged, and only the motion-converting mechanism 30 is driven, so that only the hammer action is performed. In the hammer drill mode, the clutch is engaged, and both the motion-converting mechanism 30 and the rotation-transmitting mechanism 38 are driven, so that both the hammer action and the drill action are performed. The mode of the rotary hammer 1A is switched by a clutch switching mechanism that is configured to operate in response to a manual rotation of a mode changing knob 39 that is disposed on the first housing 11. The structure for switching the mode is well-known, and therefore the specific description and illustration thereof are omitted.

The structures (elements, components) disposed in the second housing 13 are now described.

As shown in FIG. 1, the upper portion 133 is connected to the upper end portion of the grip 131 and extends frontward. A rear portion of the upper portion 133 has a generally rectangular box-like shape having an open bottom. The rear portion of the upper portion 133 covers a rear portion of the driving-mechanism housing part 111 from above. A front portion of the upper portion 133 has a hollow circular cylindrical shape, and disposed around an outer periphery of a front portion of the driving-mechanism housing part 111 (more specifically, a portion that houses the tool holder 34).

The grip 131 is formed as a hollow cylindrical portion and extends in the up-down direction. As described above, the trigger 153 is disposed in the front portion of the grip 131. The trigger 153 is held to be pivotable substantially in the front-rear direction about a lower end portion thereof serving as a pivot point. A switch 154 is disposed in the grip 131. The switch 154 is kept in an OFF state in an initial state in which the trigger 153 is not pressed. When the trigger 153 is pressed, the switch 153 is placed to an ON state. The switch 154 is electrically connected to a controller 151 via wires (not shown), and is configured to output a signal that indicates the ON state or the OFF state to the controller 151.

As shown in FIG. 1, the lower portion 135 is formed as a hollow body and extends frontward from the lower end portion of the grip 131. A rear portion of the lower portion 135 is smaller in its height in the up-down direction than a front portion of the lower portion 135. Hereinafter, the rear portion of the lower portion 135 is referred to as a connection part 136. The battery holder 5A, to which the battery 8 is detachably attachable, is held by a lower end portion of the connection part 136. The battery holder 5A and the structure for holding the battery holder 5A will be described in detail below.

The front portion of the lower portion 135 has a generally rectangular box-like shape. The front portion of the lower portion 135 protrudes downward relative to the connection part 136. The controller 151 is housed in a rear end portion of the front portion of the lower portion 135. Thus, the front portion of the lower portion 135 is hereinafter referred to as a controller housing part 138. The controller 151 is configured to drive the motor 2 while the switch 154 is in the ON state, based on the signals from the switch 154. When the battery 8 is attached (in an attached state) to the battery holder 5A, the controller housing part 138 is located directly in front of the battery 8. A lower surface of the controller housing part 138 is located at substantially the same position as a lower surface of the battery 8 in the up-down direction. A cushion 6A is held on (at) a rear side of the controller housing part 138. The cushion 6A will be described in detail below.

Details of the battery holder 5A and related structures will be described.

Figure 2:
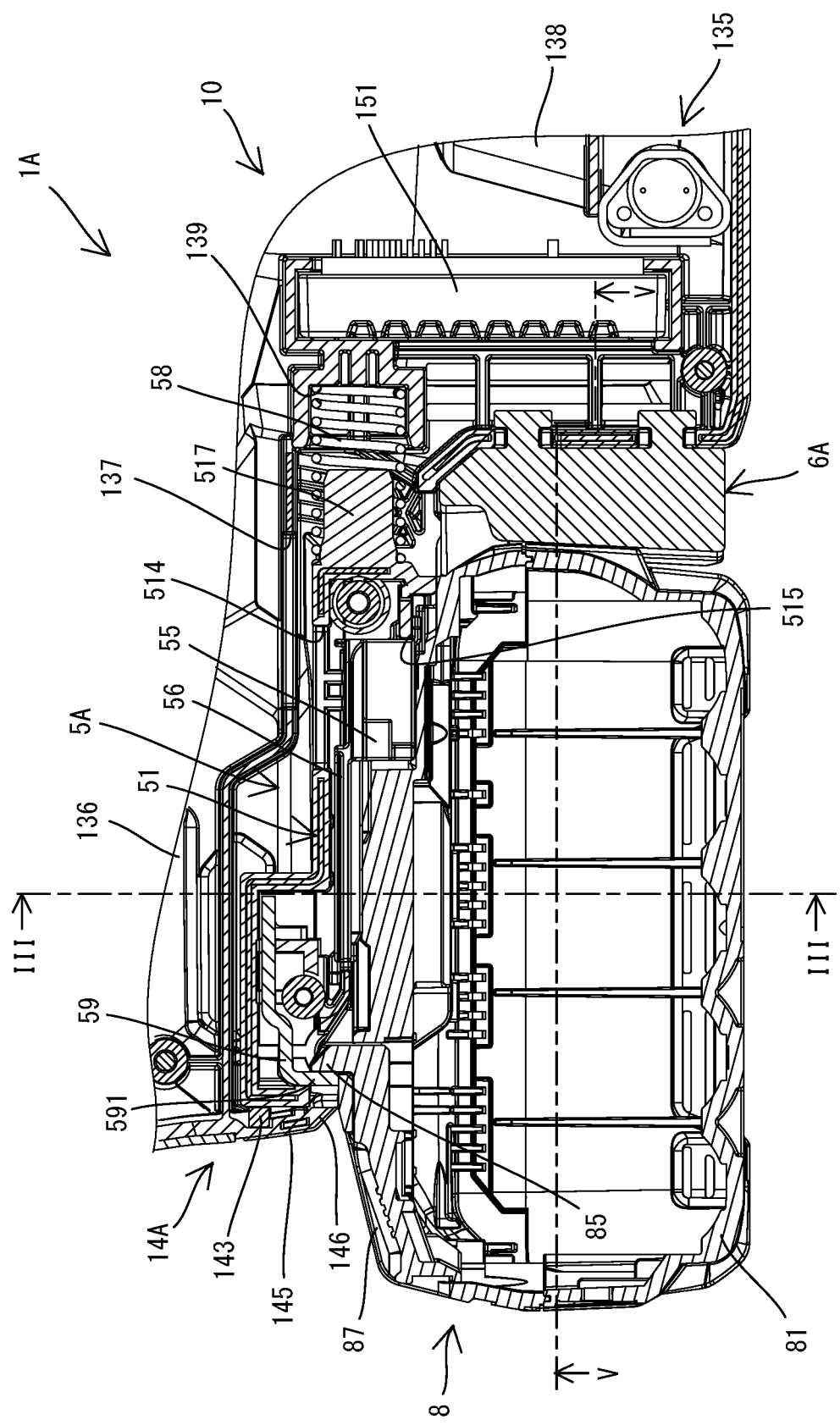
FIG. 2 is a partial enlarged view of FIG. 1.
Figure 3:
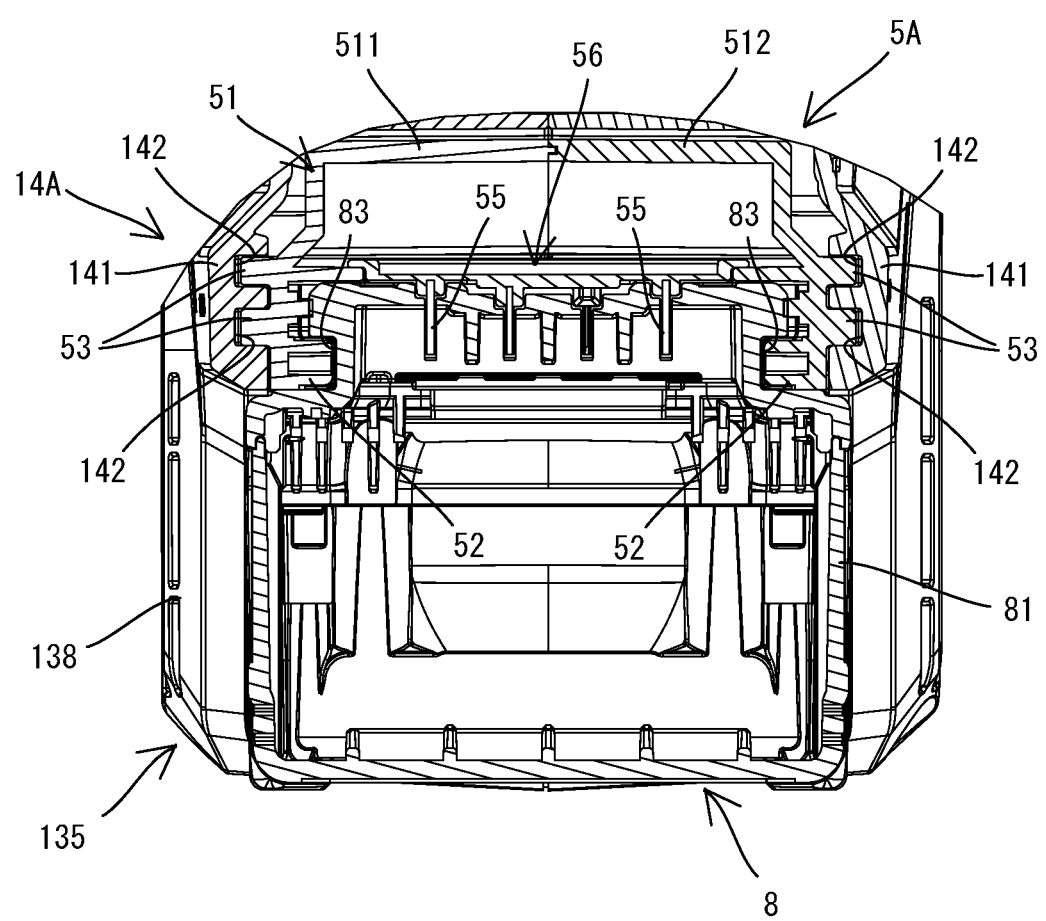
FIG. 3 is a cross-sectional view taken along line in FIG. 2.

Firstly, the structure of the battery 8, which is attachable to the battery holder 5A, is described. The battery 8 is a rechargeable battery (also called a battery pack) having a well-known structure. The battery 8 includes a case 81 and battery cells (not shown) disposed in the case 81. As shown in FIG. 2 and FIG. 3, the case 81 has a substantially rectangular parallelepiped shape. The case 81 is provided with a pair of guide grooves 83, a hook 85, a button 87, and terminals (specifically, a positive output terminal and a negative output terminal, both are not shown). For the sake of convenience in the following description, an up-down direction of the battery 8 is defined in a state in which the battery 8 is attached to the rotary hammer 1A.

The guide grooves 83 are formed in two opposite side walls that are arranged along a longitudinal direction of the battery 8 (a left-right direction in FIG. 2, a direction that is orthogonal to the face of FIG. 3), among side walls of the case 81. Each of the guide grooves 83 is formed in an upper end portion of an outer surface of the side wall and extends linearly in the longitudinal direction of the battery 8.

The hook 85 is disposed in one end portion in the longitudinal direction of the case 81. The hook 85 is always biased upward. When a downward external force is not applied to the hook 85, the hook 85 is held in a protruding position (the position shown in FIG. 2) in (at) which the hook 85 protrudes upward from an upper surface of the case 81. When the button 87 disposed in the vicinity of the hook 85 is manually pressed, the hook 85 is moved to a retracted position below the protruding position. In the present embodiment, when the hook 85 is in (at) the retracted position, the hook 85 is located below the upper surface of the case 81. The hook 85 has a rear surface that is substantially orthogonal to a line extending in the front-rear direction when the battery 8 is attached to the battery holder 5A, and an inclined (oblique) surface that is inclined downward from an upper end of the rear surface toward the front. The terminals are disposed on the upper end portion of the case 81.

Figure 4:
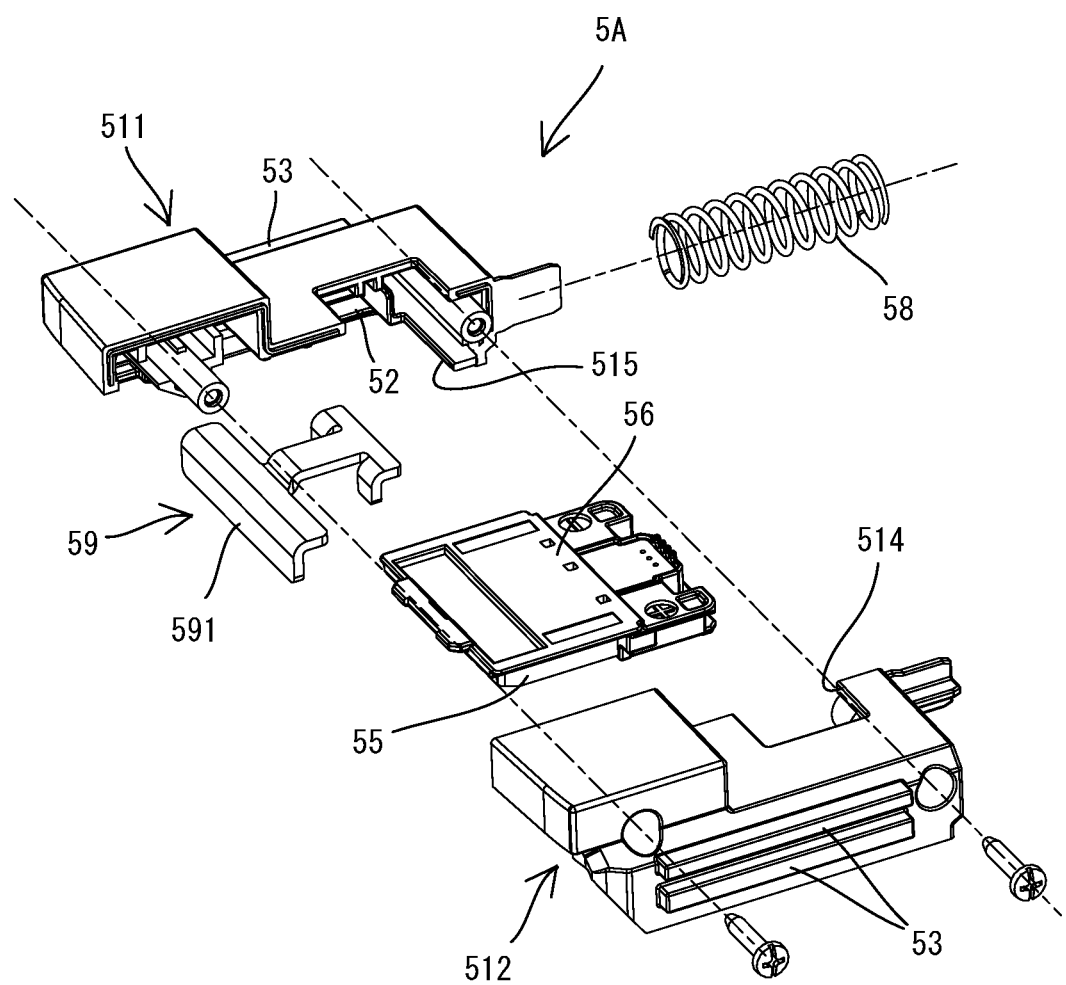
FIG. 4 is an exploded perspective view of a battery holder.

Next, the structure of the battery holder 5A is described. The battery holder 5A is configured to removably receive the battery 8 (i.e., configured such that the battery 8 is detachably attachable). The battery holder 5A is held by the housing 10 so as to be movable in the front-rear direction relative to the housing 10. As shown in FIG. 2 through FIG. 4, in the present embodiment, the battery holder 5A includes terminals 55, a terminal block 56, and a case 51.

The terminals 55 are electrically connectable to the terminals of the battery 8, respectively. Although the detailed illustration thereof is omitted, the terminals 55 include at least a positive input terminal and a negative input terminal that are electrically connectable to the positive output terminal and the negative output terminal of the battery 8, respectively. The terminals 55 are supported by (on) the terminal block 56. The terminal block 56 has a rectangular shape when viewed from above.

The case 51 is configured to hold the terminal block 56 and to removably receive the battery 8.

In the present embodiment, the case 51 as a whole is a hollow body having a generally rectangular parallelepiped shape. The case 51 is formed by fixedly connecting (coupling) two members (hereinafter referred to as a left member 511 and a right member 512) divided in the left-right direction left using screws. Each of the left member 511 and the right member 512 is made of synthetic resin. The terminal block 56 is interposed and held (sandwiched) between the left member 511 and the right member 512 in the left-right direction such that the terminal block 56 is substantially immovable relative to the case 51. The case 51 having such a holding structure using two members can facilitate assembly of the battery holder 5A.

An opening 514 is formed in an upper wall of the case 51. The opening 514 enables wires (not shown) connected to the terminal block 56 to be drawn out of the case 51. The wires pass through an opening 137 formed in a bottom wall of the connection part 136 and are connected to the controller 151.

An opening 515 is formed in a bottom wall of the case 51. The opening 515 is provided for receiving an upper portion of the battery 8. The opening 515 is open rearward, and thus the upper portion of the battery 8 is allowed to enter the case 51 from the rear end of the opening 515 and to be moved forward. A lower end portion of the case 51 has a pair of rails 52. The rails 52 are disposed at lower end portions of left and right side walls of the case 51 (above the opening 515), respectively, and extend in the front-rear direction in parallel to each other. The rails 52 are slidably engageable with the guide grooves 83 formed in the upper portion of the battery 8, respectively. When the user attaches (mounts) the battery 8 to the case 51, the user linearly slides the battery 8 forward from the rear side of the battery holder 5A, in a state in which the guide grooves 83 are engaged with the rails 52. Thus, a direction in which the battery 8 is attached (received, mounted) to the battery holder 5A (an attaching direction) is the frontward direction. A direction in which the battery 8 is detached (disconnected, removed) from the battery holder 5A (a detaching direction) is the rearward direction.

A hook engaging member 59 is disposed in a rear portion of the case 51. In order to house the hook engaging member 59, the rear portion of the case 51 projects upward relative to the other portion of the case 51. When the battery 8 is attached to the battery holder 5A and hook 85 is located at the protruding position, the hook engaging member 59 is engaged with the hook 85. A rear end portion of the hook engaging member 59 has an L-shape in a side view, and has an engagement part 591 that is configured to come into contact with a rear end surface of the hook 85 from the rear. The hook engaging member 59 is, similar to the terminal block 56, interposed and held (sandwiched) between the left member 511 and the right member 512. The hook engaging member 59 is made of metal (for example, iron alloy) for securing strength thereof.

Further, the case 51 is configured to engage with the housing 10 so as to be movable in the front-rear direction relative to the housing 10. Thus, the left and right side walls of the case 541 have two pairs of left and right rails 53. More specifically, each side wall has two rails 53. The two rails 53 are formed on an outer surface of each side wall, spaced apart from each other in the up-down direction, and extend in the front-rear direction, in parallel to each other.

A holding structure of the battery holder 5A in the housing 10, and the structures in the vicinity of the battery holder 5A are now described.

As shown in FIG. 2 and FIG. 3, a lower rear end portion of the connection part 136 is formed as a holding part 14A, which is configured to hold the battery holder 5A to be movable in the front-rear direction. The holding part 14A is located below the grip 131 (see FIG. 1). The holding part 14A includes left and right side walls 141 and a rear wall 145. The side walls 141 extend downward relative to the rear wall 145. A housing space for the battery holder 5A is formed between the side walls 141.

As shown in FIG. 3, the left and right side walls 141 have two pairs of left and right guide grooves 142, corresponding to the two pairs of left and right rails 53 of the battery holder 5A. More specifically, two guide grooves 142 are formed in an inner surface of a lower portion of each of the side walls 141. The two guide grooves 142 are spaced apart from each other in the up-down direction, and extend in the front-rear direction, in parallel to each other. The two pairs of left and right rails 53 of the battery holder 5A are slidably engaged with the two pairs of guide grooves 142, so that the battery holder 5A is linearly movable in the front-rear direction relative to the housing 10. In the present embodiment, the housing 10 and the battery holder 5A are engaged with each other via the two pairs of guide grooves 142 and the two pairs of rails 53, so that the strength of the engagement structure is secured and the stability of the engagement is maintained.

As shown in FIG. 2, a lower portion of the rear wall 145 is formed as a contact part 146, which is configured to come into contact with the hook 85 and pushes the hook 85 downward in a process in which the battery 8 is moved to be attached (received, mounted) to the battery holder 5A. The contact part 146 has an inclined (oblique) surface that is inclined forward and downward. The inclination angle of the inclined surface of the contact part 146 is substantially the same as the inclination angle of the inclined surface of the hook 85 of the battery 8. The engagement part 591 of the hook engaging member 59 of the battery holder 5A is disposed in front of the contact part 146. A lower end of the rear wall 145 and a lower end of the engagement part 591 are located at substantially the same position in the up-down direction.

Figure 5:
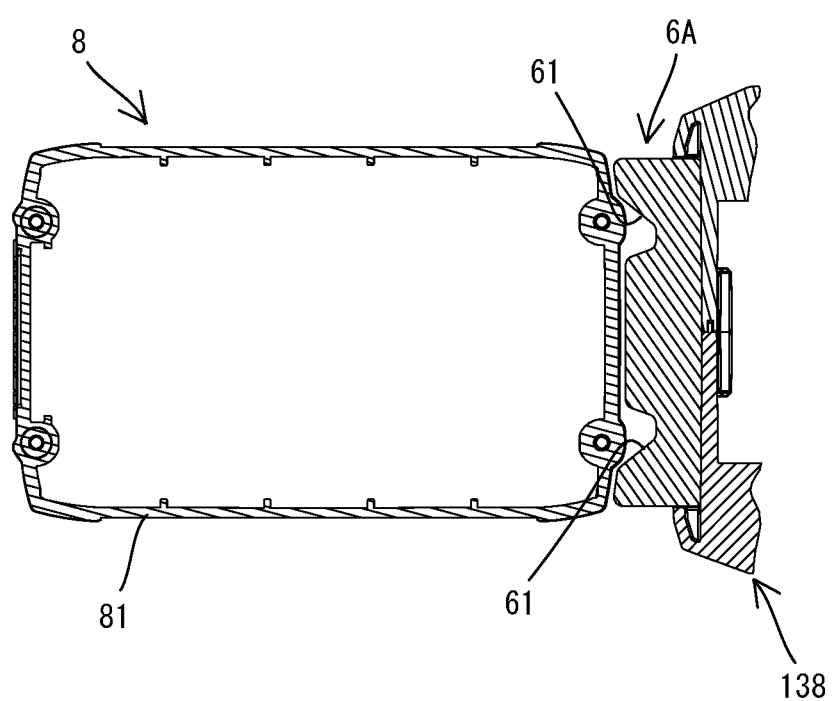
FIG. 5 is a cross-sectional view taken along line V-V in FIG. 2.

As shown in FIG. 2 and FIG. 5, a cushion 6A is held on a rear side of the controller housing part 138. The cushion 6A is configured to deform, when the battery 8 attached to the battery holder 5A moves frontward relative to the housing 10 and comes into contact with the cushion 8, to thereby cushion (absorb) the impact. In the present embodiment, the cushion 6A is made of rubber. More specifically, the cushion 6A is connected (coupled, mounted) to a rear wall of the controller housing part 138 such that the cushion 6A faces (opposes) a front surface of the battery 8 when the battery 8 is attached to the battery holder 5A. Two grooves 61 extending in the up-down direction are formed in a rear end portion of the cushion 6A. A rear end surface of the cushion 6A (more specifically, surfaces of portions in which the grooves 61 are not formed) is shaped to substantially match (conform to) a front surface of the case 81 of the battery 8.

Further, as shown in FIG. 2, a biasing member 58 is disposed between the battery holder 5A and the housing 10. In the present embodiment, a compression coil spring is adopted as the biasing member 58. A first end of the biasing member 58 is fitted around a projection 517, which projects forward from the center of the front end portion of the case 51 of the battery holder 5A, and a second end of the biasing member 58 is fitted in a recess 139, which is formed in the controller housing part 138, respectively. The biasing member 58 always biases the battery holder 5A and the controller housing part 138 rearward and forward, respectively. Thus, in an initial state in which an external force toward the front is not applied to the battery holder 5A, the battery holder 5A is held in a position (hereinafter referred to as an initial position) in (at) which a rear wall of the case 51 contacts a stopper 143 that is disposed on an inner surface of the rear wall 145 of the holding part 14A. As shown in FIG. 2 and FIG. 5, when the battery holder 5A is located in (at) the initial position, the front surface of the battery 8 (specifically, the front surface of the case 81) is not in contact with the rear end surface of the cushion 6A (i.e., the front surface of the battery 8 is located rearward of the rear end surface of the cushion 6A with a small gap therebetween).

In the present embodiment, the biasing force of the biasing member 58 is set to fulfill the following two conditions. The first condition is that, when the user attaches (couples, mounts) the battery 8 to the battery holder 5A, the biasing member 58 exerts the biasing force against a forward pressing force applied to the battery 8 in response to the act of attaching the battery 8 to the battery holder 5A, such that the biasing force allows only a slight movement of the battery holder 5A within a range in which the battery 8 does not come into contact with the cushion 6A. The second condition is that, when the battery holder 5A moves frontward together with the battery 8 due to the impact that is generated when the rotary hammer 1A falls on the ground or the floor, the biasing member 58 allows the battery holder 5A to move to an extent in which the battery 8 elastically deforms the cushion 6A.

The attaching (coupling, mounting) operation of the battery 8 to the battery holder 5A is now described.

Firstly, the user engages the guide grooves 83 of the battery 8 with the rails 52 of the battery holder 5A and linearly slides the battery 8 frontward relative to the battery holder 5A. In the process in which the user slides the battery 8 frontward, the hook 85 comes into contact with the contact part 146 of the holding part 14A. More specifically, the inclined surface of the hook 85 comes into contact with the inclined surface of the contact part 146 from the rear. When the user slides the battery 8 further frontward, the hook 85 is pushed downward by the contact part 146 from the protruding position to the retracted position in a state in which both of the inclined surfaces are in contact with each other. Since the contact part 146 is disposed on the housing 10, the hook 85 can be reliably pushed down, compared with an embodiment in which the contact part 146 is disposed on the battery holder 5A, which is movable together with the battery 8 relative to the housing 10.

When the user slides the battery 8 further frontward and the battery 8 reaches a predetermined position relative to the battery holder 5A, the terminals of the battery 8 and the terminals 55 of the battery holder 5A are electrically connected to each other. Also, the hook 85 returns to the protruding position and engages with the hook engaging member 59, with the rear end surface of the hook 85 in contact with the engagement part 591. The battery 8 is thus locked to the battery holder 5A, and the attaching operation of the battery 8 is completed. Since the biasing force of the biasing member 58 is set as described above, the user can easily attach the battery 8 to the battery holder 5A.

Actions of the battery holder 5A and the cushion 6A when the rotary hammer 1A falls on the ground or the floor are now described.

When the rotary hammer 1A falls on the ground or the floor, a portion of the battery 8 that is not adjacent to the housing 10 (the rear portion of the battery 8, in particular) may collide with the ground or the floor prior to the housing 10. When the rotary hammer 1A falls in a posture or state in which the center of gravity of the rotary hammer 1A is located directly above the rear portion of the battery 8 (in other words, in a posture or state in which the substantially whole weight of the rotary hammer 1A acts on the rear portion of the battery 8) and the rear portion of the battery 8 collides with the ground or the floor, a large impact force is applied to the rear portion of the battery 8. Among various power tools, the rotary hammer 1A is a relatively large and heavy power tool, and the battery 8 forms a portion of the outline of the rotary hammer 1A when the battery 8 is attached to the rotary hammer 1A. Therefore, an especially large impact is liable to be applied to the battery 8.

Although the specific illustration thereof is omitted, the center of gravity of the rotary hammer 1A with the battery 8 attached thereto is located below the driving axis A1 and in the vicinity of the driving mechanism 3 and the motor 2. Therefore, when the rotary hammer 1A falls on the ground or the floor while the center of gravity is directly above the rear portion of the battery 8, an impact force having a component in the frontward direction is applied to the battery 8.

Figure 6:
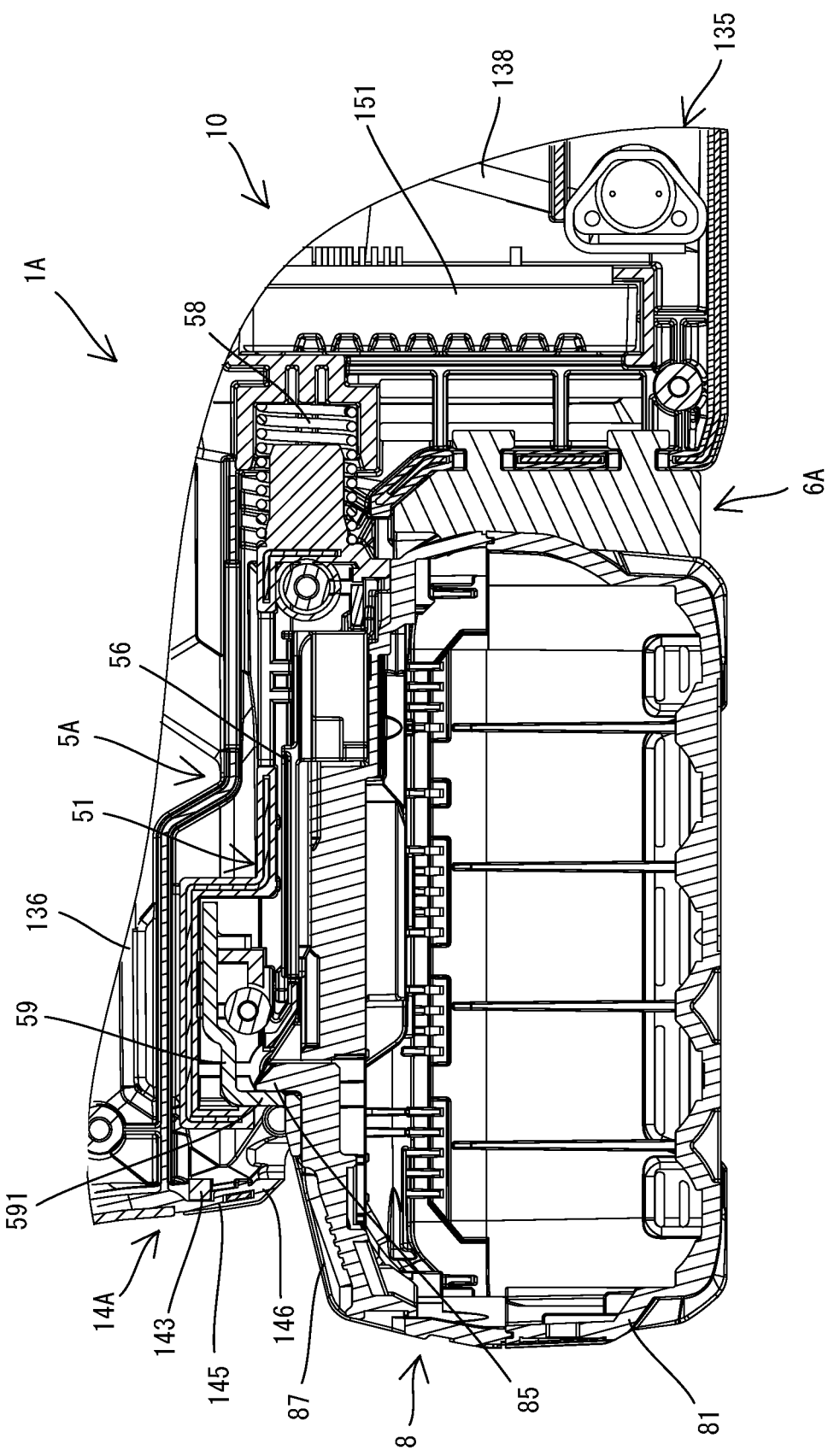
FIG. 6 is a view for explaining a state when the battery holder is moved.

As a countermeasure, the battery holder 5A, to which the battery 8 is attached, is movable in the front-rear direction relative to the housing 10. Further, the cushion 6A is disposed (intervenes) between the battery 8 and the housing 10 (the controller housing part 138) in the front-rear direction. Thus, as shown in FIG. 6, when the rear portion of the battery 8 collides with the ground or the floor, the battery holder 5A slides frontward together with the battery 8 relative to the housing 10, and the battery 8 collides with the cushion 6A. The cushion 6A is elastically deformed and thus absorbs the impact, thereby reduces the possibility of damage to the battery 8. In this manner, the rotary hammer 1A of the present embodiment can effectively protect the battery 8 from the external force (in particular, the impact force when the rotary hammer 1A falls in a posture or state in which the center of gravity is directly above the rear portion of the battery 8), owing to the battery holder 5A and the cushion 6A.

Further, as described above, the battery holder 5A is biased by the biasing member 58 away from the cushion 6A (i.e., rearward), and therefore the battery holder 5A is held in the initial position unless an external force toward the opposite direction (i.e., a forward external force) is applied to the battery holder 5A. In the initial position, the battery 8 attached to the battery holder 5A is not in contact with (spaced apart from) the cushion 6A. This arrangement can enhance the cushioning effect of the cushion 6A when the battery holder 5A moves frontward together with the battery 8. Further, since the battery holder 5A and the holding part 14A of the housing 10 are engaged with each other to be slidable relative to each other, when the external force is applied to the battery 8, the battery holder 5A can easily move relative to the housing 10.

In addition, since the rear portion of the cushion 6A has two grooves 61, the cushion 6A deforms in response to coming into contact with the front surface of the battery 8 at several positions (specifically, three regions on the rear surface). The cushion 6A having such a shape is more easily deformable, compared to an embodiment in which a substantially entire region of the rear surface of the cushion 6A contacts the front surface of the battery 8 (namely, in surface contact). Thus, the cushion 6A can absorb the impact more effectively.

In the present embodiment, the hook 85 of the battery 8 is engageable with not the housing 10 but the hook engaging member 59 (specifically, the engagement part 591) of the battery holder 5A. Therefore, even when the battery holder 5A is moved relative to the housing 10 as described above, the engagement of the hook 85 and thus the attached state of the battery 8 to the battery holder 5A can be stably maintained.

A rotary hammer 1B according to another embodiment is described with reference to FIG. 7 and FIG. 8 below. The rotary hammer 1B of the present embodiment includes a holding part 14B, a battery holder 5B, and cushions 6B that are different from the holding part 14A, the battery holder 5A, and the cushion 6A of the rotary hammer 1A (see FIG. 1 through FIG. 5). Further, the rotary hammer 1B does not include a biasing member for biasing the battery holder 5B. The structures of the rotary hammer 1B other than the above-mentioned differences are substantially identical (although having slightly different shapes) to the structures of the rotary hammer 1A. Therefore, in the following description and the drawings to be referred to hereinafter, the same reference numerals are assigned to substantially the same structures as those of the rotary hammer 1A, and the description thereof will be simplified or omitted.

Figure 7:
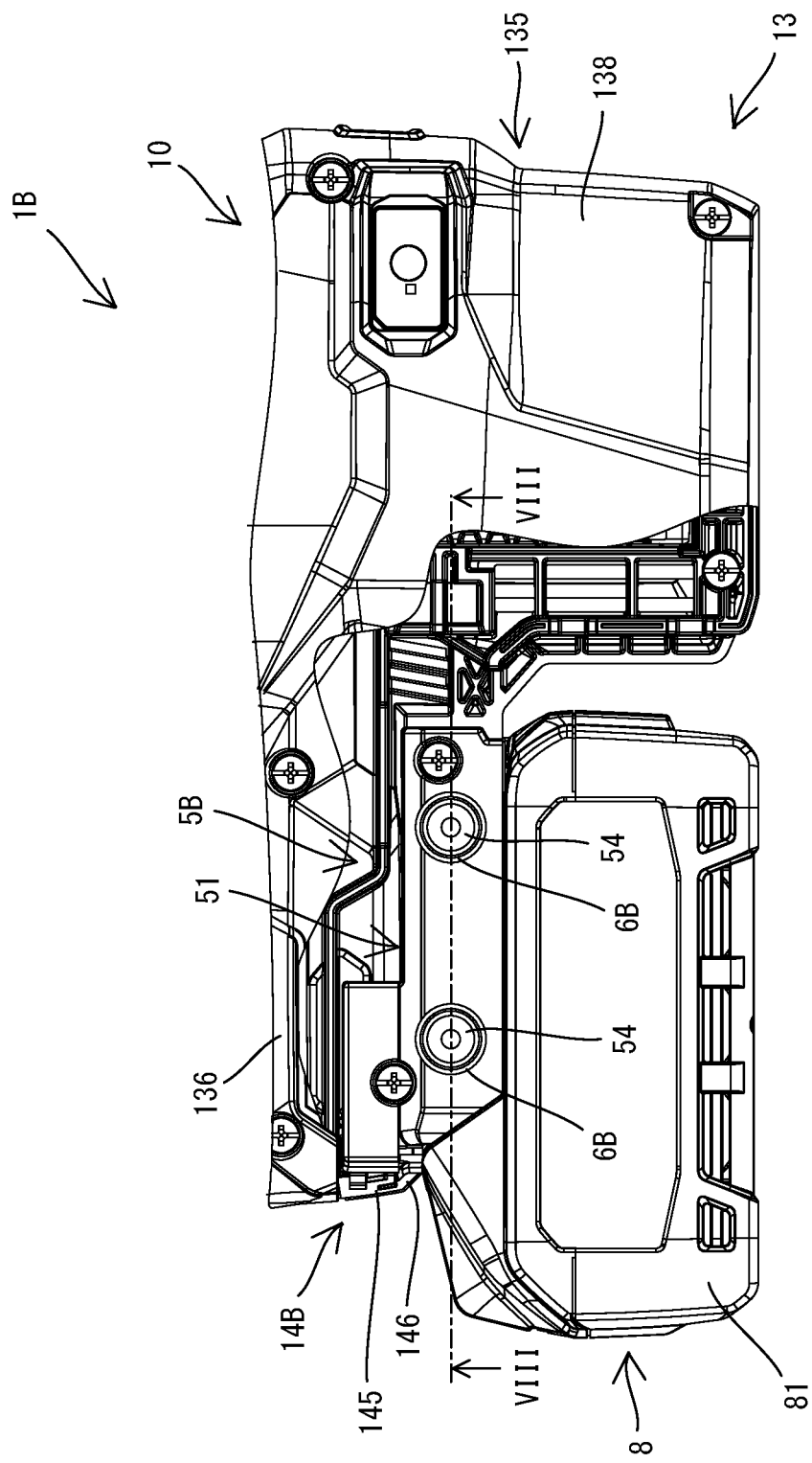
FIG. 7 is a partial cross-sectional view of a rotary hammer.
Figure 8:
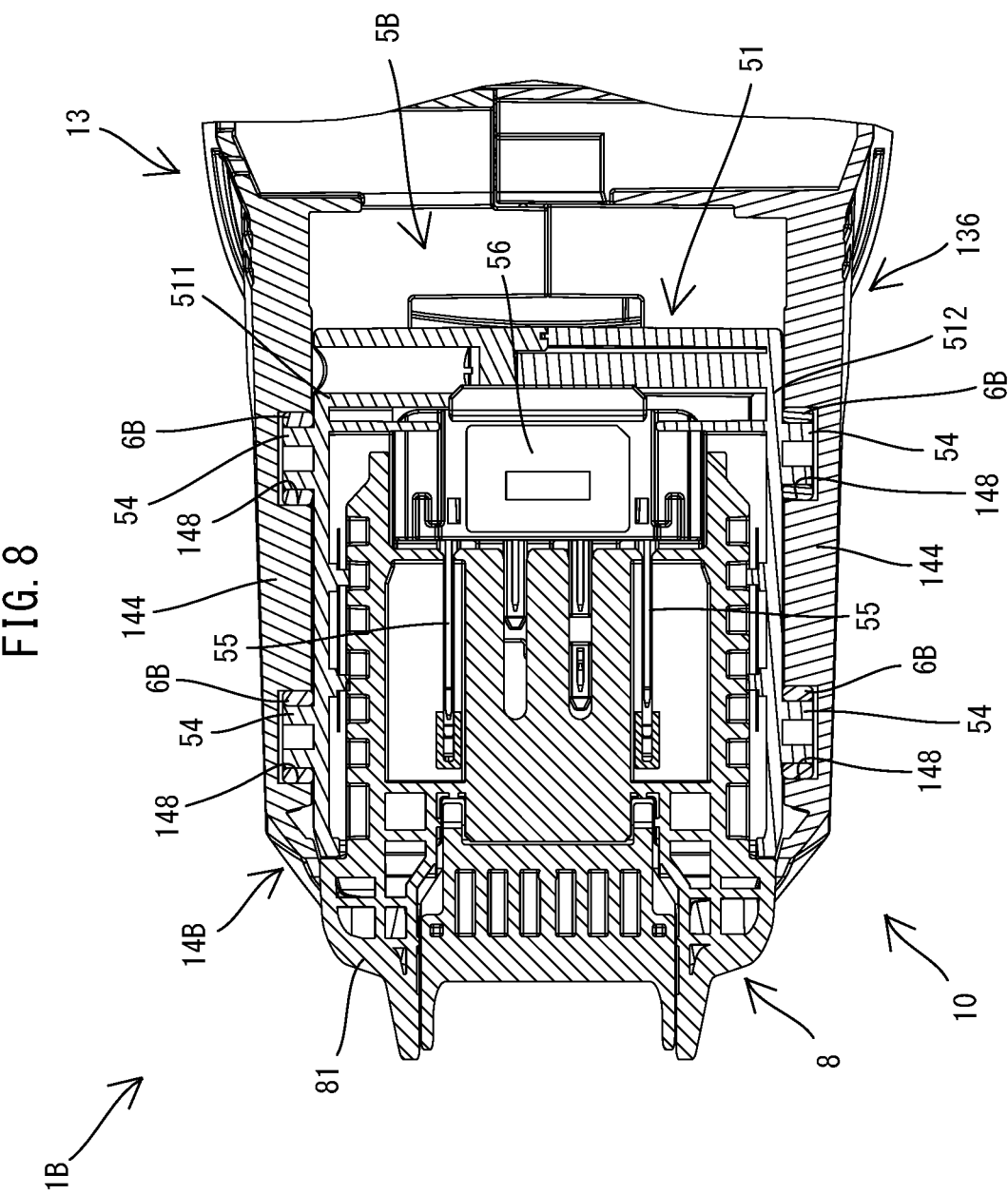
FIG. 8 is a cross-sectional view taken along line VIII-VIII in FIG. 7.

As shown in FIG. 7 and FIG. 8, in the present embodiment, the battery holder 5B is held via the cushions 6B to be movable relative to the holding part 14B.

Similar to the holding part 14A in the previous embodiment, the holding part 14B has the left and right side walls 141 and the rear wall 145 (see FIG. 2 and FIG. 3). On the other hand, unlike the holding part 14A, two recesses 148 are formed in each of the left and right side walls 141, instead of the two guide grooves 142. The recess 148 is a bottomed recess that has a circular cross-section.

Similar to the battery holder 5A in the embodiment shown in FIG. 4, the battery holder 5B includes the case 51, the terminals 55, the terminal block 56 supporting the terminals 55, and the hook engaging member 59. The terminal block 56 and the hook engaging member 59 are interposed and held between the left member 511 and the right member 512 of the case 51. The rails 52 are disposed on the lower end portion of the case 51. Thus, the battery holder 5B has the same structures as those of the battery holder 5A relating to the engagement and the electrical connection with the battery 8.

On the other hand, as shown in FIG. 8, unlike the battery holder 5A, two projections 54, instead of the rails 53, are provided on the outer surface of each of the side walls of the case 51. The projection 54 has a circular cylindrical shape and has an outer diameter that is smaller than the diameter of the recess 148. The projection 54 projects into the recess 148 of the side wall 141. A tip end of the projection 54 is slightly spaced apart from the bottom of the recess 148.

In the present embodiment, the rotary hammer 1B includes four cushions 6B. Each of the cushions 6B is a hollow circular cylindrical (annular) member made of rubber. Each of the cushions 6B is fitted around the projection 54 and fitted in the recess 148.

With such a configuration, the battery holder 5B is connected (coupled) to the housing 10 (specifically, to the second housing 13) via the cushions 6B, and thus the battery holder 5B is movable relative to the housing 10 not only in the front-rear direction but also in all directions intersecting an axis of the projection 54 (an axis extending in the left-right direction).

Actions of the battery holder 5B and the cushions 6B when the rotary hammer 1B falls on the ground or the floor are now described.

When the rotary hammer 1B falls on the ground or the floor, the battery holder 5B moves together with the battery 8 relative to the housing 10 while elastically deforming the cushions 6B. The battery holder 5B moves relative to the housing 10 to thereby reduce the impact to the battery 8. In addition, the cushions 6B absorb the impact. In this manner, the rotary hammer 1B of the present embodiment can protect the battery 8 effectively from an external force, owing to the battery holder 5B and the cushions 6B.

In the present embodiment, the battery holder 5B is movable relative to the housing 10 in all directions intersecting the axis of the projection 54. Thus, the battery 8 can be protected effectively from external forces applied in various directions. For example, when the rotary hammer 1B falls on the ground or the floor in a posture or state in which the center of gravity is located directly above the rear portion of the battery 8, the impact force applied to the battery 8 includes not only the component in the frontward direction but also a component in the upward direction. The battery holder 5B and the cushions 6B can exert a superior effect to such component in the impact force.

Correspondences between the features of the above-described embodiments and the features of the disclosure are as follows. The features of the above-described embodiments are merely exemplary and do not limit the features of the present disclosure or the present invention.

Each of the rotary hammers 1A and 1B is an example of "a power tool" or "a power tool having a hammer mechanism". The driving axis A1 is an example of "a driving axis". The motor 2 is an example of "a motor". The housing 10 is an example of "a housing". Each of the battery holders 5A and 5B is an example of "a battery holder". The battery 8 is an example of "a battery". Each of the cushions 6A and 6B is an example of "a cushion". The biasing member 58 is an example of "a biasing member". The terminal 55, the terminal block 56, the left member 511, and the right member 512 are examples of "a first terminal", "a terminal block", "a first member", and "a second member", respectively. The case 81 and the hook 85 are examples of "a case" and "a locking member", respectively. The engagement part 591 is an example of "an engagement part". The contact part 146 is an example of "a contact part".

The above-described embodiments are merely exemplary embodiments of the disclosure and power tools according to the present disclosure is not limited to the rotary hammers 1A, 1B of the above-described embodiments. For example, the following modifications may be made. Further, one or more of these modifications may be employed in combination with any one of the rotary hammer 1A, 1B of the above-described embodiments and the claimed features.

The structure (shape, dimensions, material, components, or the like) of each of the battery holders 5A and 5B may be modified as needed. For example, the case 51 may be formed by a front member and a rear member connected (coupled) with each other, or by a lower member and a lid connected (coupled) with each other, instead of the left member 511 and the right member 512. Alternatively, the case 51 may be formed by three or more members connected together. The terminal block 56 and the hook engaging member 59 may be held by the case 51 not in an interposed (sandwiched) manner, but in a different manner, such as using screws or the like. The hook engaging member 59 may be omitted and the rear wall of the case 51 may be configured to receive the hook 85 located in (at) the protruding position.

The engagement structure between the battery holder 5A, 5B and the battery 8 is not limited to the sliding engagement structure between the rails 52 and the guide grooves 83. For example, contrary to the above embodiments, guide grooves may be formed in the battery holder 5A, 5B and rails may be disposed on the battery 8. The number of the guide grooves and the number of the rails may be modified as needed. Further, for example, a projection that linearly projects may be disposed on a first one of the battery holder 5A, 5B and the battery 8 while a recess that is configured to be fitted around the projection may be disposed on a second one of the battery holder 5A, 5B and the battery 8. In such an embodiment, a projecting direction of the projection defines an attaching/detaching direction of the battery 8. The attaching/detaching direction of the battery 8 to/from the battery holder 5A, 5B may be, for example, the left-right direction or the up-down direction.

The engagement structure between the battery holder 5A, 5B and the housing 10 may be similarly modified as needed. For example, contrary to the rotary hammer 1A, guide grooves may be formed in the battery holder 5A and rails may be disposed on the holding part 14A. The number of the guide grooves, the number of the rails, and the positions thereof may be modified as needed. Further, contrary to the rotary hammer 1B, recesses may be formed in the battery holder 5B and projections and cushions may be disposed on the holding part 14B. The number of the recesses, the number of the projections, the number of the cushions, and the positions thereof may be also modified as needed. The direction in which the battery holder 5A, 5B is movable relative to the housing 10 (i.e. the moving direction of the battery holder 5A, 5B) is not limited to the example described in the above-described embodiments. The position of the cushion 6A may also be modified in accordance with the changes in the moving direction. However, it is preferable that the moving direction is determined in accordance with the direction of the impact force to be applied when the rotary hammer 1A, 1B falls on the ground or the floor in a posture or state in which the center of gravity is directly above a portion of the battery 8.

The shape, number, material of the cushion 6A, 6B are not limited to the examples described in the above embodiments. For example, in the rotary hammer 1A, a plurality of cushions may be disposed, instead of one cushion 6A. In such an embodiment, for example, the cushions may be held on (connected, coupled to) the rear wall of the controller housing part 138 and the cushions may be spaced apart from each other in the left-right direction (or in the up-down direction). Similar to the rotary hammer 1A, the cushion 6A may be additionally disposed in the rotary hammer 1B. Each of the cushions 6A and 6B may be made of an elastic (resilient) material other than rubber (for example, synthetic resin having elasticity (resilience) (e.g., urethane foam) or the like). Further, the biasing member 58 may be a different type of spring (a tension spring, a torsion spring, etc.) or may be made of an elastic (resilient) material (e.g., rubber, synthetic resin, etc.).

The structures (elements, components) disposed in the housing 10, including the motor 2, the driving mechanism 3, and the controller 151, the arrangement thereof, and the structure of the housing 10 may be also modified as needed. The arrangement of the battery holder 5A, 5B may be modified in accordance with the change in the housing 10.

For example, the motor 2 may be arranged such that the rotational axis of the motor shaft 25 extends in parallel to the driving axis A1. The motion-converting mechanism 30 may employ an oscillating member, instead of the crank mechanism, in order to convert rotary motion to linear motion.

The shape of each of the first housing 11 and the second housing 13, the structures, number, and positions of the elastic element(s) (the elastic members 121 and 123) interposed between the first housing 11 and the second housing 13 may be modified as needed. For example, a handle, which includes a grip, formed in a C-shape may be elastically connected to a rear end portion of the first housing 11 that is formed in an L-shape. In such an embodiment, for example, the battery holder 5A, 5B may be held by the holding part 14A, 14B that is disposed in (at) the lower end portion of the motor housing part 117 of the first housing 11. In a case in which the battery holder 5A is adopted in this embodiment, the cushion 6A may be held on the lower end portion of the motor housing part 117. Further, as described above, in an embodiment in which the rotational axis of the motor shaft 25 extends in parallel to the driving axis A1, the first housing 11 may extend along the driving axis A1 and only an upper end portion of a handle including a grip may be elastically connected (coupled) to the first housing 11 in a cantilever fashion. In this embodiment, similar to the above-described embodiment, the battery holder 5A, 5B may be held by the holding part 14A, 14B that is disposed in (at) the lower end portion of the handle.

The power tools according to the present disclosure are not limited to the rotary hammers 1A and 1B, which are also examples of power tools having a hammer mechanism. The power tools herein refer to general tools for machining or the like that are configured to operate with electric power supplied from a battery, for example. For example, the power tool according to the present disclosure may be formed as a power tool having a hammer mechanism (for example, an electric hammer) that is different from the rotary hammer. Alternatively, the power tool according to the present disclosure may be formed as a so-called rotary tool (for example, a shear wrench) that is configured to rotationally drive a final output shaft. The housing 10 and the structures (elements, components) disposed within the housing 10 may be modified in accordance with a kind of the power tool.

Further, in view of the nature of the present disclosure, the above-described embodiments and the modifications thereto, the following Aspects 1 to 4 are provided. Any one of the Aspects 1 to 4 can be employed alone or in combination with any one of the rotary hammers 1A, 1B of the above-described embodiments, the above-described modifications and the claimed features.

(Aspect 1)

The power tool further comprises a driving mechanism configured to linearly drive the tool accessory along the driving axis using power generated by the motor,
wherein:
the housing comprises:
a first portion extending along the driving axis and having a first end portion and a second end portion;
a second portion protruding from the first end portion of the first portion in a third direction crossing the driving axis and having a protruding end portion; and
a third portion protruding from a region of the second portion between the the first portion and the protruding end portion of the second portion in the third direction, the third portion extending in parallel to the driving axis and away from the second end of the first portion,
the driving mechanism is disposed in the first portion;
the motor is disposed in the second portion such that a rotational axis of a motor shaft intersects the driving axis;
the battery holder is held by the third portion; and
when the battery is attached to the battery holder, the battery faces (opposes) the protruding end portion of the second portion in an extension direction of the driving axis.

The driving-mechanism housing part 111 is an example of "the first portion" in this aspect. The rear end portion and the front end portion of the driving-mechanism housing part 111 are examples of "the first end portion" and "the second end portion", respectively. The motor housing part 117 and the controller housing part 138 as a whole is an example of "the second portion". A lower end portion of the controller housing part 138 is an example of "the protruding end portion". The connection part 136 is an example of "the third portion".

(Aspect 2)

In Aspect 1, the cushion is held on (at) the protruding end portion of the second portion.

(Aspect 3)

The power tool further comprises:
a driving mechanism configured to linearly drive the tool accessory along the driving axis using power generated by the motor; and
a controller configured to control the driving of the motor,
wherein:
the housing comprises a first housing and a second housing elastically connected to each other,
the first housing comprises:
a driving-mechanism housing part that houses the driving mechanism and that extends along the driving axis; and
a motor housing part that houses the motor and that protrudes from one end portion of the driving mechanism housing in a fourth direction crossing the driving axis;
the second housing comprises:
a grip that extends in the fourth direction;
a cover part that extends from one end portion of the grip substantially in parallel to the driving axis and that at least partially covers the driving mechanism housing;
a controller housing part that houses the controller and that is disposed on an opposite of the motor housing from the driving-mechanism housing part in the fourth direction; and a connection part that extends from the other end portion of the grip substantially in parallel to the driving axis and that connects the grip and the controller housing, the battery holder is held on (at) the connection part, and when the battery is attached to the battery holder, the battery faces (opposes) the controller housing part in an extension direction of the driving axis.

The driving mechanism 3 is an example of "the driving mechanism" in this aspect. The controller 151 is an example of "the controller" in this aspect. The first housing 11 and the second housing 13 are examples of "the first housing" and "the second housing", respectively, in this aspect. The driving-mechanism housing part 111 is an example of "the driving-mechanism housing part" in this aspect. The motor housing part 117 is an example of "the motor housing part" in this aspect. The grip 131, the upper portion 133, the controller housing part 138, and the connection part 136 are examples of "the grip", "the cover part", "the controller housing part", and "the connection part", respectively, in this aspect.

(Aspect 4)

In Aspect 3, the cushion is held on (at) the controller housing.

DESCRIPTION OF THE REFERENCE NUMERALS 1A, 1B: rotary hammer, 10: housing, 11: first housing, 111: driving mechanism housing, 117: motor housing, 121: elastic member, 123: elastic member, 13: second housing, 131: grip, 133: upper portion, 135: lower portion, 136: connection part, 137: opening, 138: controller housing, 139: recess, 14A, 14B: holding part, 141: side wall, 142: guide groove, 143: stopper, 145: rear wall, 146: contact part, 148: recess, 151: controller, 153: trigger, 154: switch, 2: motor, 25: motor shaft, 3: driving mechanism, 30: motion-converting mechanism, 34: tool holder, 36: striking mechanism, 38: rotation-transmitting mechanism, 39: mode changing dial, 5A, 5B: battery holder, 51: case, 511: left member, 512: right member, 514: opening, 515: opening, 517: projection, 52: rail, 53: rail, 54: projection, 55: terminal, 56: terminal block, 58: biasing member, 59: hook engaging member, 591: engagement part, 6A, 6B: cushion, 61: groove, 8: battery, 81: case, 83: guide groove, 85: hook, 87: button, A1: driving axis.

What is claimed is:

1. A power tool comprising:
    a motor;
    a housing that houses the motor;
    a battery holder (i) held by the housing to be movable at least in a first direction relative to the housing and (ii) being configured to removably receive a battery for supplying electric power to the motor;
    a cushion held by the housing; and
    a biasing member configured to bias the battery holder away from the cushion in the first direction,
    wherein the housing, the battery holder, the cushion and the biasing member are configured such that:
    when the battery is attached to the battery holder, the cushion is directly between the battery and the housing;
    when an external force toward the cushion is not applied to the battery holder, the battery holder is held in an initial position by a biasing force of the biasing member;
    when the battery holder is in the initial position, there is a vacant space between the cushion and the battery attached to the battery holder; and
    when the battery holder is moved from the initial position to a second position against the biasing force of the biasing member, the cushion directly collides with the battery and the power tool remains operable.

2. The power tool according to claim 1, wherein the cushion is configured to collide with the battery at multiple positions.

3. The power tool according to claim 2, wherein the cushion is at a forward side of the battery in an advancing direction of the battery when the battery is moved to be attached to the battery holder.

4. The power tool according to claim 3, wherein the housing and the battery holder are configured to be slidably engaged.

5. The power tool according to claim 4, wherein the first direction is substantially parallel to a second direction in which the battery is moved to be attached to and detached from the battery holder.

6. The power tool according to claim 5, wherein the first direction is substantially parallel to a driving axis of the power tool.

7. The power tool according to claim 1, wherein the cushion is at a forward side of the battery in an advancing direction of the battery when the battery is moved to be attached to the battery holder.

8. The power tool according to claim 7, wherein:
    the motor includes a motor shaft that has a rotational axis that intersects a driving axis of the power tool;
    an extension direction of the driving axis defines a front direction of the power tool and an extension direction of the rotational axis of the motor shaft defines an up-down direction of the power tool;
    the housing includes (i) a first portion that extends along the driving axis in the front-rear direction and (ii) a second portion that projects downward from the first portion, and
    the cushion is on a rear side of a lower end portion of the second portion.

9. The power tool according to claim 1, wherein the first direction is substantially parallel to a second direction in which the battery is moved to be attached to and detached from the battery holder.

10. The power tool according to claim 1, wherein the first direction is substantially parallel to a driving axis of the power tool.

11. The power tool according to claim 1, wherein the battery holder is movable relative to the housing in multiple directions including the first direction.

12. The power tool according to claim 1, wherein:
    the battery comprises a case and a locking member,
    the locking member is movable between a first position at which the locking member protrudes from the case a first distance and a second position at which an amount of protrusion of the locking member from the case is zero or smaller than the first distance, and
    the battery holder comprises an engagement part that is engageable with the locking member when the locking member is in the first position.

13. The power tool according to claim 1, further comprising:
    a hammer mechanism that is configured to linearly drive a tool accessory along a driving axis, using power generated by the motor,
    wherein when the battery is attached to the battery holder, a portion of the battery forms a portion of an outline of the power tool.

14. A power tool comprising:
a motor;
a housing that houses the motor;
a battery holder (i) held by the housing to be movable at least in a first direction relative to the housing and (ii) being configured to removably receive a battery for supplying electric power to the motor; and
a cushion held by the housing,
wherein:
the housing, the battery holder and the cushion are configured such that, when the battery is attached to the battery holder, the cushion is between the battery and the housing,
a first one of the housing and the battery holder has at least one rail that extends in the first direction, and
a second one of the housing and the battery holder has at least one groove that extends in the first direction and that is slidably engaged with the at least one rail of the first one of the housing and the battery holder.

15. A power tool comprising:
a motor;
a housing that houses the motor;
a battery holder (i) held by the housing to be movable at least in a first direction relative to the housing and (ii) being configured to removably receive a battery for supplying electric power to the motor; and
a cushion held by the housing,
wherein:
the housing, the battery holder and the cushion are configured such that, when the battery is attached to the battery holder, the cushion is between the battery and the housing, and
the battery holder comprises:
(i) a first terminal that is electrically connectable with a second terminal of the battery;
(ii) a terminal block that supports the first terminal; and
(iii) a first member and a second member that are separate and discrete members and connected to each other such that the first member and the second member hold the terminal block between the first member and the second member.

16. A power tool comprising:
a motor;
a housing that houses the motor;
a battery holder (i) held by the housing to be movable at least in a first direction relative to the housing and (ii) being configured to removably receive a battery for supplying electric power to the motor; and
a cushion held by the housing,
wherein:
the housing, the battery holder and the cushion are configured such that, when the battery is attached to the battery holder, the cushion is between the battery and the housing;
the battery comprises a case and a locking member;
the locking member is movable between a first position at which the locking member protrudes from the case a first distance and a second position at which an amount of protrusion of the locking member from the case is zero or smaller than the first distance;
the battery holder comprises an engagement part that is engageable with the locking member when the locking member is in the first position; and
the housing comprises a contact part configured to come into contact with the locking member and to move the locking member from the first position toward the second position when the battery is moved to be attached to the battery holder.

* * * * *